United States Patent [19]

Numberger

[11] Patent Number: 4,619,606
[45] Date of Patent: Oct. 28, 1986

[54] VERTICAL MALTDRYING KILN

[76] Inventor: Christian K. Numberger, Muhlberg 38 1/2, D-8257 St. Wolfgang, Fed. Rep. of Germany

[21] Appl. No.: 699,407

[22] Filed: Feb. 7, 1985

[30] Foreign Application Priority Data

Feb. 10, 1984 [DE] Fed. Rep. of Germany ....... 3404804

[51] Int. Cl.$^4$ .......................... F27D 1/08; F26B 17/12
[52] U.S. Cl. ........................................ 432/99; 34/167; 34/168; 34/174
[58] Field of Search ...................... 432/99, 95; 34/167, 34/168, 170, 173, 174; 414/174, 175, 176, 205, 206, 301

[56] References Cited

U.S. PATENT DOCUMENTS

| 400,229 | 3/1889 | Lauth | 432/99 |
|---|---|---|---|
| 3,053,522 | 9/1962 | Applegate | 432/99 |
| 4,249,891 | 2/1981 | Noyes et al. | 432/99 |
| 4,334,859 | 6/1982 | Minegishi et al. | 432/99 |

FOREIGN PATENT DOCUMENTS 1031415  3/1953  France ................................. 34/167

Primary Examiner—John J. Camby
Attorney, Agent, or Firm—Cahill, Sutton & Thomas

[57] ABSTRACT

A vertical maltdrying kiln is described whereby several flow zones for the drying air are provided within a vertical malt compartment. At least in the uppermost flow zone at least one airduct with perforated sidewalls is provided, which extends in the transverse direction through the malt compartment. In the uppermost flow zone, the drying air enters through this airduct and optionally through perforated sidewalls in the transverse direction, while it escapes in the upward direction. Preferably, a lower malt discharge lock is perforated, so that drying air may enter into the lowermost flow zone. This drying air may escape through perforated sidewalls or through airducts with perforated sidewalls. Preferably, the entire drying air of all flow zones may escape in the upward direction through the upper open end of the malt compartment.

12 Claims, 5 Drawing Figures

VERTICAL MALTDRYING KILN

The invention refers to a vertical malt drying kiln with at least one vertical malt compartment having several flow zones for the drying air one above the other and extending between an upper green malt feeding device and a lower malt discharge lock.

Such a vertical maltdrying kiln is known from Ludwig Narziss, "Die Technologie der Malzbereitung", 1976, pages 289 to 291. However, the malt to be dryed does not move continuously downward. Rather the malt compartment is subdivided into three chambers by means of gates. The chambers are filled and emptied in a batch process. First the lower chamber is emptied whereupon the content of the center chamber is transferred to the lower chamber. Thereafter the content of the uppermost chamber is transferred to the center chamber. Finally the uppermost chamber is filled with green malt. Such a discontinuous operation is rather cumbersome. The drying air flows within all three zones in the transverse direction through the malt to be dryed and the flow direction is reversed periodically. After the reversal the moisture is again driven back into the already intensely dryed zones from less intensely dryed zones. Thus the malt is subjected to a repeated dehydration and hydration. This will lead to a malt shrinkage and to enzyme losses. A flow of the air through the malt within the individual chambers in merely one transverse direction is not possible since it would establish an uneven flow distribution and also an uneven dehydration so that the malt quality would be reduced. Therefore such a vertical maltdrying kiln is not practically useful.

Therefore it is the object of the present invention to provide a vertical maltdrying kiln which may be continuously operated and which produces malt of a uniform and reproducable high quality.

This problem is solved by a maltdrying kiln, which is characterized in that within the uppermost flow zone of the malt compartment the drying air enters in the transverse direction through at least one air duct extending transverse through the malt compartment and having perforated side walls and optionally additionally through perforated side walls of the malt compartment while the drying air escapes in the upward direction.

The invention shall now be described with reference to the drawings.

Figure 1:
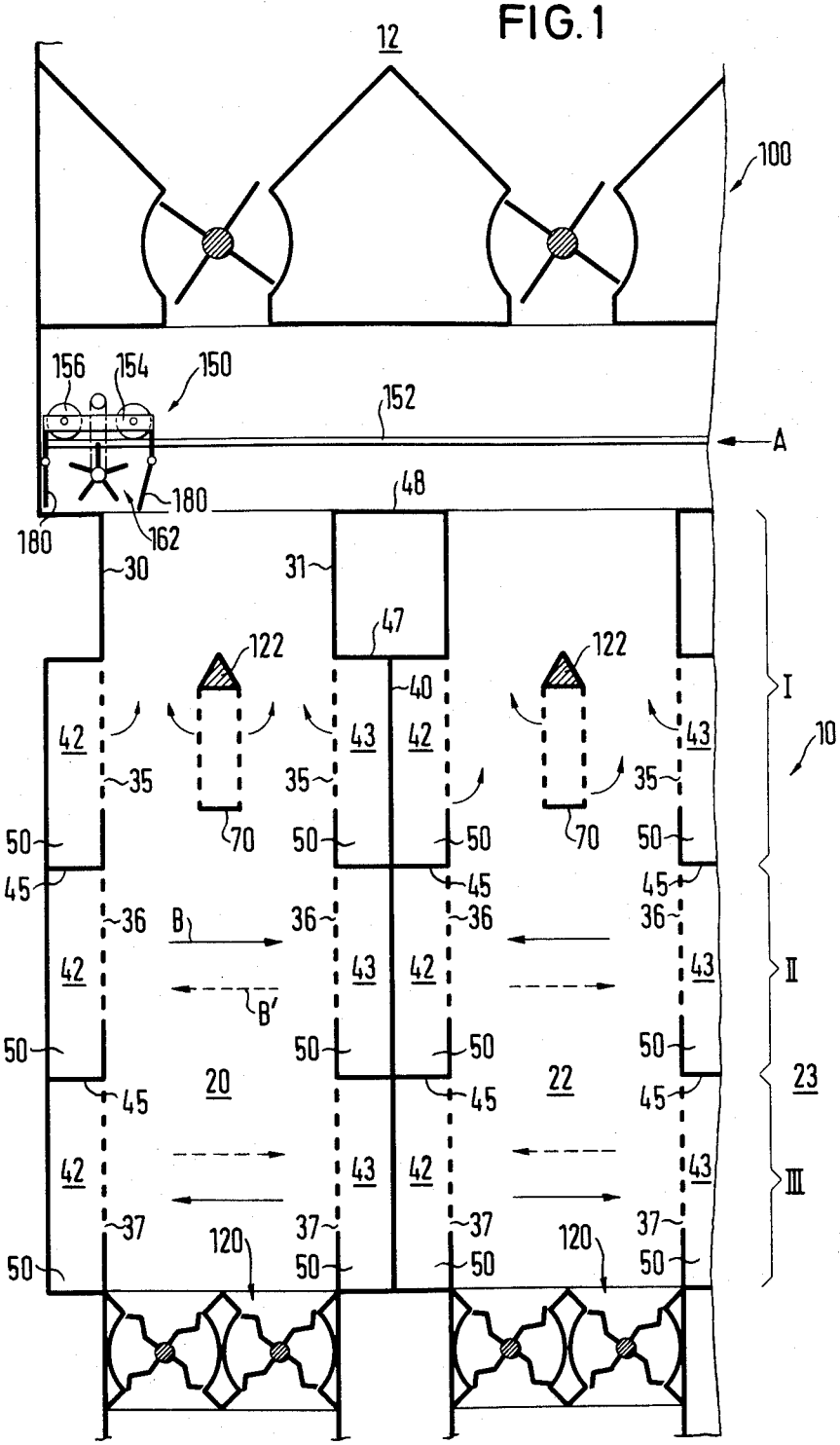
FIG. 1 shows a schematic partial sectional view through a first embodiment of the continuous vertical maltdrying kiln of the present invention.

First, the structure of the first embodiment of the malt drying kiln of the invention shall be described with reference to FIG. 1. The malt drying kiln is generally designated with 10. It extends in the vertical direction below a germination chamber 12. Between the germination chamber 12, filled with green malt and the malt drying kiln 10 a green malt transfer lock 100 is provided. At the lower end the malt drying kiln 10 is closed by a discharge lock 120. The malt drying kiln 10 is fed with green malt from the germination chamber through the green malt transfer lock 100. By actuating the discharge lock 120, the malt is removed from the kiln 10. In this manner, the malt moves continuously or semi-continuously through the malt drying kiln 10 downward. The malt drying kiln is subdivided into several vertical compartments 20, 22, 23, arranged side by side, each of which extends from the discharge lock 120 to the upper end of the malt drying kiln. In a horizontal cross-sectional view each malt drying compartment has a rectangular shape. A plurality of these malt drying compartments 20, 22, . . . , are arranged side by side in the form of a battery. Therefore, the cross-sectional area of the malt drying kiln corresponds to a multiple of the cross-sectional area of one malt drying compartment.

In the vertical direction, the malt drying kiln is subdivided into three zones, namely an upper drying zone I, a central sugar-forming zone II, and a lower finishing zone III. In agreement with this subdivision into three zones, each malt drying compartment is subdivided in the vertical direction into three sections which shall now be explained. Each malt drying compartment has two sidewalls 30, 31, as well as two front walls (not shown). The two front walls are air-impervious over the entire length. On the other hand, each of the two sidewalls 30, 31, is permeable to air in three sections corresponding to the three malt drying zones and denoted with 35, 36, and 37. For this purpose, the sidewalls may have a plurality of throughholes or other perforations. Also, a screen may be provided in these areas. Further, air chambers are provided next to these perforated sidewall sections 35, 36, 37. First, the situation between two malt drying compartments shall be explained. The two peforated surfaces 36 of the two compartments 20, 22, which face each other, have a predetermined distance from each other. A separation wall 40 is provided in between. The latter extends in the vertical direction (as seen in the longitudinal sectional view), but in the horizontal sectional view in a slanted or diagonal orientation within the interspace between the two perforated sidewalls 35, 36, 37. Thus, two separate air chambers 42, 43, are formed. The air chambers 42, 43, have a vertical extension which is greater than the vertical extension of the perforated sections 35, 36, 37. Therefore, dust boxes 50 are formed in the lower areas of the air chambers 42, 43. This structure is identical for all three zones I, II, and III, as well as for all compartments. The outer sidewall (such as 30) of the outermost malt compartments ( such as 20) are also provided with air chambers ( such as 42 ). Each of the air chambers 42, 43, has a cross-section which tapers from one front wall to the other. In the vertical direction, the air chambers are separated by separation walls 45 which also form the bottoms of the dust boxes 50. The uppermost air chambers are closed by an upper wall 47. As may be seen in FIG. 1, the sidewalls 30, 31, extend by a predetermined distance beyond the perforated areas 35 upward. At their upper end, each two sidewalls are connected by a flat cover wall 48. All cover walls 48 are in alignment. This is important for the function of the turnover and equalizing device to be described further below.

In the uppermost zone, airducts 70 are provided, which extend over the entire width of the malt drying kiln. The side walls of these airducts are similarly perforated as the perforated walls 35 of the air chambers 42, 43, of the uppermost zone I. The upper ends of the airducts are pointed, so that the movement of the malt is not hindered. A particular advantage is seen in the fact that due to these airducts green malt bridges are formed which, in the course of the malt drying process, will successively fall down and be replaced by new bridges. Preferably, the airduct 70 has a drop-shaped cross-section. This leads to a quick mixing of the malt between the newly forming bridges. Further, such a shape prevents the malt germs from entering into the air chambers and airducts.

For each malt drying zone, a separate blower may be provided which serves for injecting hot dry air. The airflow shall now be described for the central zone II in detail. The same airflow exists in the lower zone III. The upper zone I has a different airflow situation which shall be described further below.

The hot air flows in each malt compartment first through the air chamber 42, which serves as an inlet chamber from the left side through the perforated wall 36 and in the horizontal direction along solid arrow B toward the right side through the malt. Thereby, the air takes up moisture and it is cooled due to the heat of evaporation. The moist cool air leaves through the opposite perforated wall 36 and through the air chamber 43 which serves as an outlet chamber. This flow situation is preferably identical for zonesII of all malt compartments. After a predetermined period of time, the airflow direction is reversed. Now, the air flows from the individual air chambers 43 through the perforated walls 36 along the dotted arrow B' in the reverse direction to the perforated wall 36 and into the air chamber 42.

Zone III has the same structure and the same mode of operation. In the two zones II and III, the reversal of the airflow may be synchronous or independent from each other. The airflow directions in both malt drying zones II and III may be identical or reverse.

In the uppermost zone I, all chambers 42, 43, and the airducts 70 are always functioning as air inlets. The air flows from chambers 42, 43, through the perforated walls 35 simultaneously from both sides into the malt compartments 20, 22 . . . Within the malt, the air flows first in the horizontal direction and then in the vertical direction upward. Therefore, the flow resistance is smaller than in the zones II and III, so that a blower with a smaller power may be used.

The addition airducts 70 in the uppermost malt zones I lead to similar flow patterns. They have the advantage that in this zone a particularly intensive drying effect is achieved. The airflow can be increased, and the air pressure may be reduced. Further, the flow of air runs transverse to the flow of malt and also in the countercurrent direction to the flow of malt, which is particularly favourable for the heat exchange. This improves the overall airflow pattern and a complete moisture saturation may be achieved. The airflow pattern is particularly favourable due to the malt bridges, since the necessary air pressure is reduced by the formation of the malt bridges, and a more even airflow distribution may be obtained.

The distance between the perforated walls of the three malt drying zones and the air pressure in the air chambers and airducts are chosen such that the airflows in the three zones are substantially independent from each other. This guarantees that the air entering the zone II through the perforated wall 36 leaves the zone II also through the opposite perforated wall 36. Similarly, the air entering the zone III should also leave this zone III without entering zone II. Decisive for the separation of the three flow zones is the ratio of the distances between the perforated walls in the transverse direction and the distances between the individual zones in the vertical direction. The air inlet temperature is about 60° C. for zone I, about 70° C. for zone II and about 85° C. for zone III. The malt drying kiln is always filled with malt up to the height of the arrow A. Dryed malt is removed from the kiln through the discharge lock 120. At the same time, a corresponding amount of green malt is fed into the kiln through the transfer lock 100. It is preferred to use a turnover and equalizing device 150 for avoiding individual piles of malt corresponding to the openings of the transfer lock 100.

Figure 5:
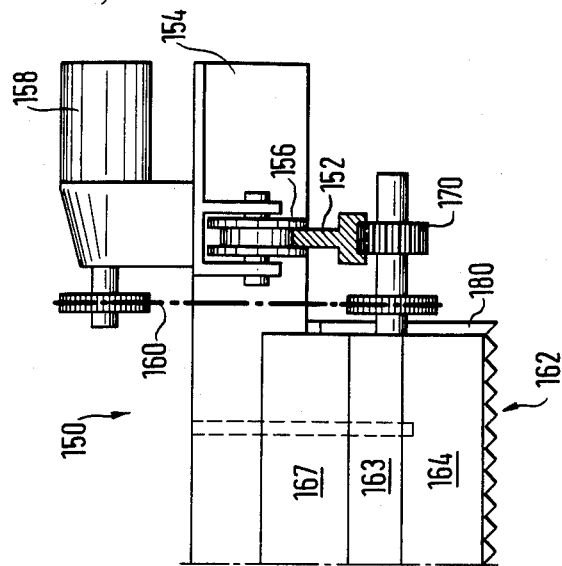
FIG. 4 shows a side view through a turnover and equalizing device for the maltdrying kiln of the present invention and FIG. 5 shows a sectional view along line V—V of FIG. 4.
Figure 4:
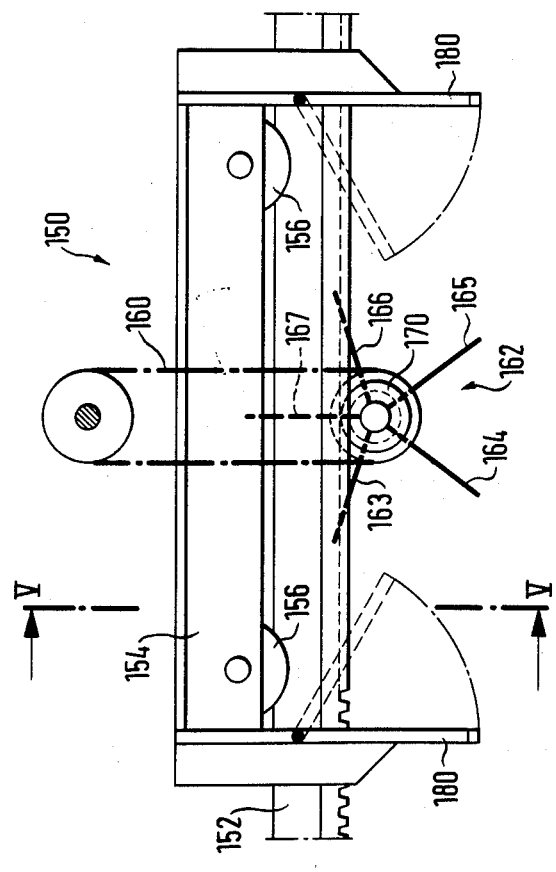

In FIGS. 4 and 5, this turnover and equalizing device 150 is shown in detail. It comprises two rails 152 and a carriage 154 with four rollers 156, two on each rail 152. The carriage 154 has a motor 158 which drives an equalizing tool 162 through a sprocket drive 160. The equalizing tool 162 is rotated. It has five plates 163–167 with equal angular distances. If the motor 158 is actuated, the equalizing tool 162 is rotated through the sprocket drive 160. Further, a gear 170 is rotated which meshes with a rack, connected with a rail 152. In this manner, the carriage 154 is moved across the kiln. Thereby, the green malt piles formed by the transfer lock are equalized. The turnover and equalizing device has additionally two equalizing rakes 180. These may be pivotable for the reverse operation. Further, their height may be adjustable. Further, the turnover and equalizing device may be used as a measurement carriage. For this purpose, devices for detecting the height of the green malt may be provided as well as devices for measuring the temperature and humidity. Notably, these feelers may be distributed over the entire width of the turnover and equalizing device, so that an information concerning the distribution of these parameters may be obtained.

Now, the operation of the malt drying kiln of the invention shall be described. First, the entire kiln is filled with malt already dryed. The germination chamber 12, provided above the kiln, is filed with green malt. This germination chamber may have a structure as described in German patent application 25 23 709, and it operates continuously. It is separated from the kiln by means of the transfer lock 100 which prevents air from entering the germination chamber from the kiln or vice versa. Next, the blowers are turned on, and the air flows along the solid arrow lines B of FIG. 1 through the kiln. At the beginning, the temperature of the air may be low. Now the locks 100 and 120 are actuated. This means that portions of the malt are discharged below, while portions of green malt are poured in the upper part of the kiln. The poured piles of green malt are equalized by means of the turnover and equalizing device. The control of the locks 100 and 120 is coordinated and in accordance with the operation of the germination chamber 12. The green malt feeding is distributed evenly over all malt compartments. To the extent, that the green malt advances downward in the course of the actuation of the locks 100 and 120, the temperature of the air is increased first in zone I, then in zone II and finally in zone III. The temperature is chosen in accordance with the desired humidity of the malt and the desired temperature and humidity of the exhausted air.

In this manner, a continuous steady state equilibrium is reached in a short time, wherein the above-mentioned air inlet temperatures exist. After appropriate periods of time, the airflow direction within zones II and III is reversed. This reversal of the airflow directions prevents the formation of an inhomogenuous airflow distribution. If after a certain duration of the airflow in one direction a danger arises that preferred airflow channels are formed, the airflow direction is reversed so that the air takes now new flow paths in the reverse direction. In addition to this reversion of the airflow direction, the malt is continuously moved downward which additionally causes the airflow to seek continuously new paths. By these two features, in conjunction with an appropriate width of the malt compartments, a completely uniform flow of air through the malt can be ensured. The malt leaving the lower lock 120 is completely uniform and of a continuously high quality.

In the uppermost zone I, the dry air flows from both sides and from the airduct 70 at first in the horizontal direction into the malt, and then within the malt upward. A flow reversal is not effected. In this zone I the major part of the moisture is removed. The dry air flows substantially counter-current to the malt moving downward. Therefore, a problem of dry malt being impressed with an airflow of high humidity cannot arise. On the other hand, a certain inhomogeneity of the malt within zone I cannot be completely prevented due to the preferred flow paths of the dry air, which are formed in this zone. However, this is not decisive due to the operation of the subsequent zones. It is essential that in zone I the major part of the moisture of the green malt is removed. In zone II additional moisture is removed. Here the air flows in the transverse direction through the malt, and the direction of flow is periodically reversed. After such a reversal, relatively dry malt lies behind relatively moist malt (as viewed in the direction of flow) and the relatively dry malt is impressed with air of relatively high humidity. However, since the major part of the moisture is already removed in zone I, this flow reversal in zones II and III does not have any deleterious effect on the malt quality. On the other hand, a complete uniformity of the malt quality in the transverse direction is achieved by this reversal of the flow direction in zones II and III, since the reversal of the flow direction is similar in effect to a mixing of the malt.

The air leaving the malt compartments may be laden with dust, for example with germ particles. These are partly deposited within the dust boxes 50 which are emptied from time to time. A separate blower may be associated to each malt zone so that the air flows within the individual malt zones may be completely separated. This enables an optimum control of the drying conditions. Therefore, malt of high quality is obtained.

The entire vertical malt drying kiln may be erected from individual parts on site or it may be assembled as a battery from prefabricated compartment units.

Figure 2:
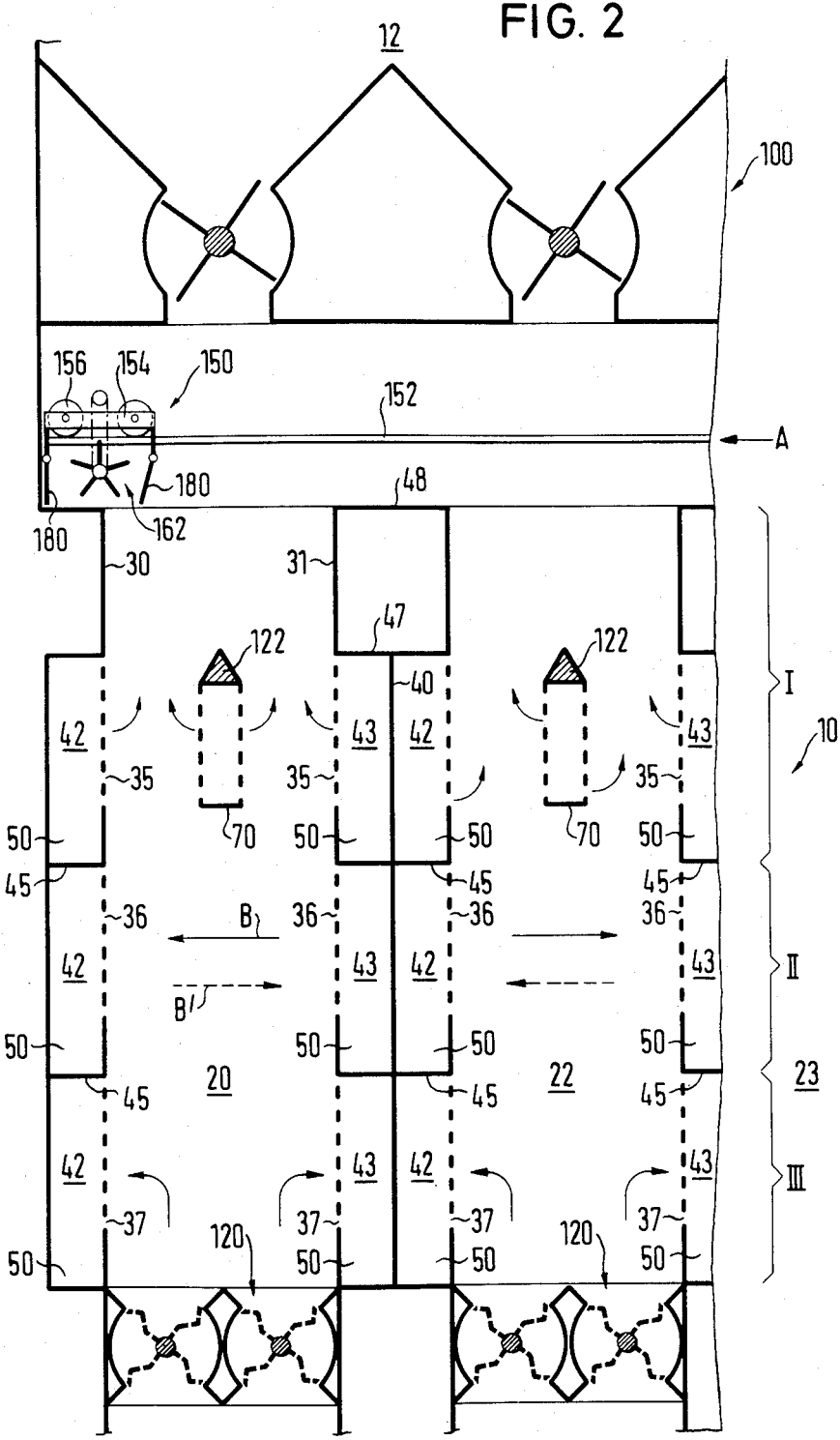
FIG. 2 shows a partial sectional view of a second embodiment of the vertical maltdrying kiln of the present invention.

Now, the second embodiment of the invention shall be described with reference to FIG. 2. Its structure corresponds largely to that of FIG. 1. Merely perforated discharge locks 120 are provided. By this perforation, the sheet metal of the locks is weakened to some extent. Therefore, it may be strengthened by bends as shown in FIG. 2. The operation of this embodiment shall now be explained. Dry air flows through the discharge lock 120 in the vertical direction upward. It flows along the arrow lines through the perforated sidewalls 37 of the lowermost zone III outward. Therefore, the airflow within this lowermost zone is partly a counter-current flow and partly a transverse flow. In the central zone II and in the uppermost zone I the same flow situation exists as in the embodiment of FIG. 1. This embodiment has the advantage that in the lowermost zone, in which the malt is already dryed to a high degree, an airflow in the transverse direction is avoided. It has been found that here an airflow, distributed over the entire cross-section of zone III meets with difficulties, since the air escapes partially in the upward direction. This causes a drying effect which is uneven over the cross-section. On the other hand, the embodiment of FIG. 2 does not lead to non-uniformity of the drying process, if air moves from the lowermost zone III into the central zone II.

Figure 3:
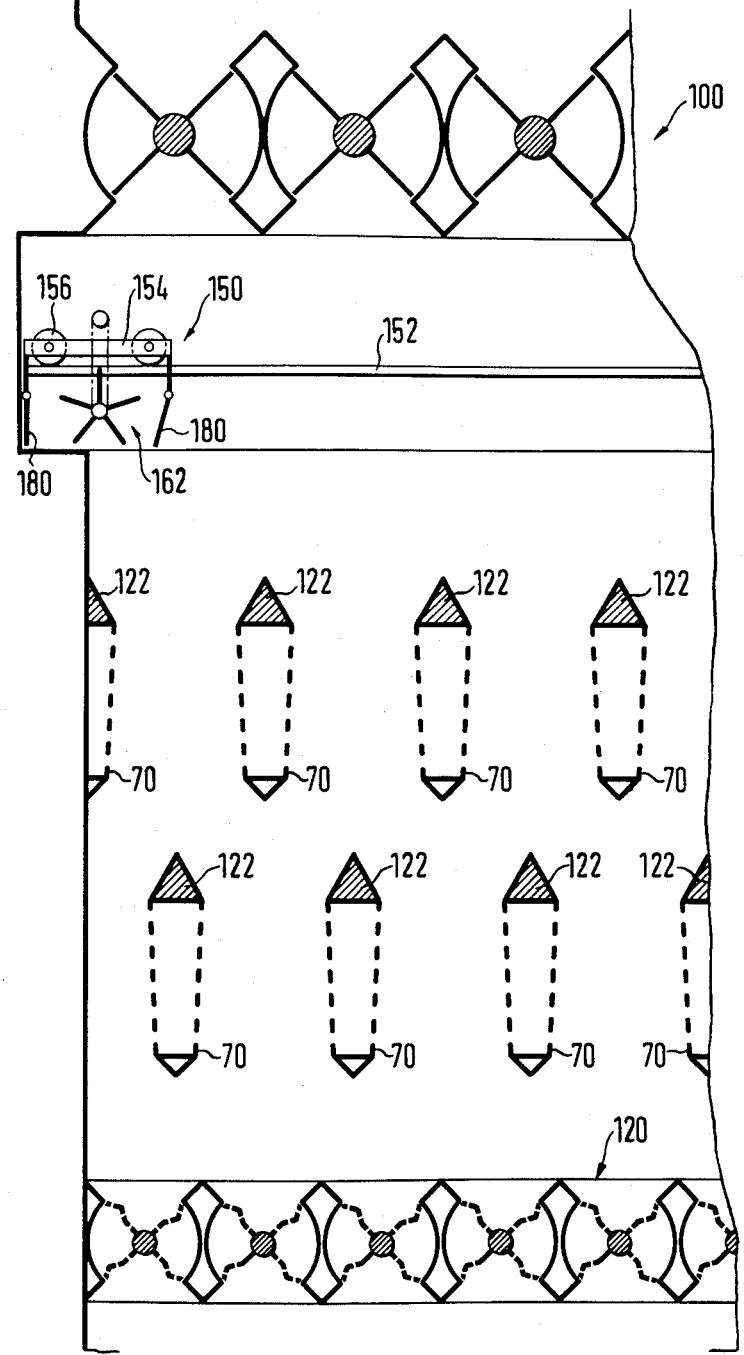
FIG. 3 shows a partial sectional view through a third embodiment of the vertical maltdrying kiln of the present invention.

Now a further embodiment of the invention shall be described with reference to FIG. 3. In this embodiment, airducts 70 are provided in the uppermost as well as in the central malt zone. Further, the malt drying kiln is not subdivided into individual compartments, since the air is introduced exclusively through the airducts 70 and through the lower perforated lock 120. Therefore, the airducts 70 replace the air chambers of the previous embodiments. In the embodiment of FIG. 3, the airducts 70 of the central zone are displaced with respect to the airducts 70 of the upper zone. The airducts 70 have preferrably a drop-shaped cross-section as shown in FIG. 3. This means that the upper end as well as the lower end of the airduct cross-section is pointed. The upper end 122 consists preferrably of a heat-insulating material. The same is preferrably true for the previous embodiments. The perforated sidewalls are slanted and approach each other in the downward direction.

Now, a preferred mode of operation of this embodiment shall be explained. The air enters through the discharge lock 120 as well as through all airducts 70. The air escapes exclusively through the uppermost zone upward. Therefore, a most favourable counter-current flow exists. In the area of the airducts 70, a transverse flow also exists. Due to the multitude of properly spaced and displaced airducts, a particularly uniform airflow pattern and thus a uniform drying is obtained. Further, the structure of this kiln is particularly compact. A high flow rate of the malt can be obtained. The displaced airducts 70 cause a mixing of the malt. Further, malt bridges form particularly easily between adjacent airducts. This will lead to an intermittent loosening of the malt. In the movement from the uppermost zone into the central zone the malt is mixed due to the displaced arrangement of the airducts 70. Thus, the drying effect is uniform. The energy consumption is particularly favourable, since the lower zones, in which a higher pressure must exist, require only a smaller airflow rate. The air pressure requirements are particularly favourable due to the formation of malt bridges which are formed since the malt is supported by the airducts.

In a modified mode of operation, an exclusively transverse airflow may be established in the central zone. In this case the airducts 70 of the central zone are alternately operated as air inlets and air outlets. In this modified mode of operation, the air entering through the discharge lock 120 flows preferrably through the airducts 70 of the central zone, which are operated as air outlets.

The airducts 70 may be controlled individually. It is particularly advantageous to attach feelers to the individual airducts, notably at the tips of these ducts. Here, the feelers will cause the smallest disturbance. This allows a detailed monitoring of the operation of the kiln over a relatively large cross-sectional area of e.g. 4×5 m. The sensors may be used for measuring the temperature, the pressure and the humidity so that a complete picture of the flow and drying situation over the entire cross-section may be obtained.

In a modified embodiment, locks similar to the discharge lock 120 may be provided between the uppermost and the central zone and between the central and the lower zone. This will provide a better separation of the airflows. This is true particularly for the first two embodiments. The additional locks are operated in such a fashion that the malt drops down alternately toward the right and toward the left side. Such an operation is also preferred for the locks 100 and 120.

In a further embodiment of the invention, the malt drying kiln may consist of two zones. The kiln has again the structure shown in FIG. 3. The uppermost airducts 70 are exclusively air inlets. The central airducts 70 are exclusively air outlets. The drying air flows through the discharge lock 120 upward, and thereafter in the transverse direction through the central airducts 70 out of the kiln. On the other hand, drying air flows through the uppermost airducts 70 first in the transverse direction into the malt and then upward, as in the previous embodiments.

I claim:

1. In a vertical malt drying kiln, the improvement comprising:
   (a) a plurality of compartments each having walls for containing malt to be dried and having means for supplying green malt at the top of said compartment and means for removing dried malt at the bottom thereof, each of said compartments divided into a plurality of vertically adjacent flow zones, each zone defined by the presence of a drying air flow originating in that zone; and
   (b) means defining an air duct extending through the uppermost zone in said compartment, said air duct having perforated side walls for directing drying air transversely into malt within said zone and thence upwardly and out the top of said compartment.

2. The combination set forth in claim 1 wherein the walls of said compartment are perforated, and including means for supplying drying air through the perforations in a selected wall transversely through a zone and through the perforations in the wall opposite said selected wall.

3. The combination set forth in claim 2 including means for reversing the direction of said drying air flow.

4. A kiln according to one of claims 1, 2 or 3, characterized in that drying air enters the lowermost flow zone through a perforated discharge lock.

5. A kiln according to claim 4, characterized in that three flow zones are provided and that in the central flow zone transverse airducts with perforated sidewalls are provided which are alternately switched for air inlet and air outlet.

6. A kiln according to one of claims 1, 2 or 3, characterized in that the entire drying air is exhausted upward through the upper end of the malt compartment.

7. A kiln according to one of claims 1, 2 or 3, characterized in that the airducts have a drop-shaped cross-section or a cross-sectional shape similar to the drop shape.

8. A kiln according to one of claims 1, 2 or 3, characterized in that the airducts have an upper pointed end.

9. A kiln according to one of claims 1, 2 or 3, characterized in that the airducts have an upper area of insulating material.

10. A kiln according to one of claims 1, 2 or 3, characterized in that the airducts are provided with feelers for measuring the operation parameters of the malt compartment, notably the temperature and the humidity, and that the feelers are preferably provided at the upper tip.

11. A kiln according to one of claims 1, 2 or 3, characterized in that a turnover and equalizing device with at least one equalizing rake is provided at the upper end of the malt compartment, whereby this device optionally comprises feelers for measuring the operation parameters, notably the height of the malt filling, the temperature and the air humidity.

12. A kiln according to one of claims 1, 2 or 3, characterized in that the airducts of adjacent flow zones are displaced relative to each other, when viewed in the vertical direction.

* * * * *